(12) United States Patent
Takeda et al.

(10) Patent No.: US 9,781,705 B2
(45) Date of Patent: Oct. 3, 2017

(54) USER TERMINAL RADIO BASE STATION AND RADIO COMMUNICATION METHOD

(71) Applicant: NTT DOCOMO, INC., Tokyo (JP)

(72) Inventors: Kazuaki Takeda, Tokyo (JP); Yoshihisa Kishiyama, Tokyo (JP); Kohei Kiyoshima, Tokyo (JP); Tooru Uchino, Tokyo (JP); Yuta Sagae, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 229 days.

(21) Appl. No.: 14/652,400

(22) PCT Filed: Nov. 12, 2013

(86) PCT No.: PCT/JP2013/080557
§ 371 (c)(1),
(2) Date: Jun. 15, 2015

(87) PCT Pub. No.: WO2014/097776
PCT Pub. Date: Jun. 26, 2014

(65) Prior Publication Data
US 2015/0327230 A1    Nov. 12, 2015

(30) Foreign Application Priority Data

Dec. 17, 2012   (JP) ................................. 2012-274881

(51) Int. Cl.
*H04W 72/04* (2009.01)
*H04L 1/18* (2006.01)
(Continued)

(52) U.S. Cl.
CPC ....... *H04W 72/0406* (2013.01); *H04L 1/1607* (2013.01); *H04L 1/1861* (2013.01);
(Continued)

(58) Field of Classification Search
None
See application file for complete search history.

(56) References Cited

U.S. PATENT DOCUMENTS 9,544,880 B2 * 1/2017 Song ........................ H04L 1/00
2011/0310759 A1 * 12/2011 Gerstenberger ........ H04L 5/001
370/252

(Continued)

FOREIGN PATENT DOCUMENTS

| KR | WO 2012050389 A1 * | 4/2012 | ........... H04L 1/1861 |
| KR | WO 2012161510 A2 * | 11/2012 | ........... H04L 5/0053 |
| KR | WO 2013062238 A1 * | 5/2013 | ........... H04L 1/1861 |

OTHER PUBLICATIONS

New Postcom, "PUCCH on SCell;" 3 GPP TSG-RAN2 #76; R2-115977; San Francisco, U.S.; Nov. 14, 2011 (4 pages).
(Continued)

*Primary Examiner* — Ayaz Sheikh
*Assistant Examiner* — Tarell Hampton
(74) *Attorney, Agent, or Firm* — Osha Liang LLP

(57) ABSTRACT

In order to control feedback control information in uplink transmission appropriately even when using carrier aggregation in HetNet, the present invention provides a user terminal that is able to communicate with a plurality of radio base stations having overlapping coverage areas by using carrier aggregation, the user terminal comprising: a reception section that receives downlink shared channel signals using component carriers of a primary cell and a secondary cell; a generating section that generates transmission acknowledgement signals in response to the downlink shared channel signals; and an allocating section that allocates the transmission acknowledgement signals to predetermined uplink control channel resources, wherein the allocating section allocates the transmission acknowledgement signals to either or both of uplink control channel (Continued)

IN 3 OR MORE-CELL CASE resources of the primary cell and uplink control channel resources of the secondary cell in accordance with contents of the transmission acknowledgement signals and/or an uplink control channel format.

7 Claims, 12 Drawing Sheets

(51) Int. Cl.
*H04L 5/00* (2006.01)
*H04L 1/16* (2006.01)
(52) U.S. Cl.
CPC ............ *H04L 5/001* (2013.01); *H04L 5/0055* (2013.01); *H04W 72/04* (2013.01)

(56) References Cited

U.S. PATENT DOCUMENTS

| | | | | |
|---|---|---|---|---|
| 2012/0039275 | A1* | 2/2012 | Chen | H04L 1/1607 370/329 |
| 2012/0207107 | A1* | 8/2012 | Li | H04W 52/58 370/329 |
| 2012/0257513 | A1* | 10/2012 | Yamada | H04L 1/0618 370/248 |
| 2013/0028205 | A1* | 1/2013 | Damnjanovic | H04L 5/001 370/329 |
| 2013/0039321 | A1* | 2/2013 | Kim | H04W 72/0413 370/329 |
| 2013/0070689 | A1* | 3/2013 | Liu | H04W 72/0413 370/329 |
| 2013/0114472 | A1* | 5/2013 | Tamaki | H04L 1/1854 370/280 |
| 2013/0114575 | A1* | 5/2013 | Fu | H04L 5/0053 370/336 |
| 2013/0136108 | A1* | 5/2013 | Cheng | H04L 1/1861 370/336 |
| 2013/0155898 | A1* | 6/2013 | Yin | H04L 1/0026 370/254 |
| 2013/0195065 | A1* | 8/2013 | Park | H04L 1/1861 370/329 |
| 2013/0208691 | A1* | 8/2013 | Yang | H04L 1/0029 370/329 |
| 2013/0223301 | A1* | 8/2013 | Lee | H04W 72/042 370/281 |
| 2013/0242799 | A1* | 9/2013 | Yin | H04L 1/1861 370/254 |
| 2013/0272187 | A1* | 10/2013 | Malladi | H04W 76/02 370/315 |
| 2013/0322357 | A1* | 12/2013 | He | H04W 72/0406 370/329 |
| 2013/0322358 | A1* | 12/2013 | He | H04W 72/0406 370/329 |
| 2014/0029584 | A1* | 1/2014 | Qu | H04W 72/042 370/336 |
| 2014/0119284 | A1* | 5/2014 | Baldemair | H04L 5/003 370/328 |
| 2014/0126517 | A1* | 5/2014 | Choi | H04L 5/001 370/329 |
| 2014/0161060 | A1* | 6/2014 | Nam | H04L 5/0055 370/329 |
| 2014/0192757 | A1* | 7/2014 | Lee | H04L 1/1861 370/329 |

OTHER PUBLICATIONS

3GPP TR 25.912 V7.1.0; "3rd Generation Partnership Project; Technical Specification Group Radio Access Network, Feasibility study for evolved Universal Terrestrial Radio Access (UTRA) and Universal Terrestrial Radio Access Network (UTRAN) (Release 7)," Sep. 2006 (57 pages).
3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9);" Mar. 2010 (107 pages).
International Search Report issued in PCT/JP2013/080557, dated Feb. 10, 2014 (1 page).
Office Action issued in corresponding Japanese Application No. 2012-274881, dated Jan. 24, 2017 (6 pages).

* cited by examiner

FORMAT 1a
(w/o SPATIAL MULTIPLEXING)

|     | Ch1 |
| --- | --- |
| DTX | 0   |
| N   | 1   |
| A   | −1  |

A : ACK
N : NACK

FIG.3A

FORMAT 1b
(w/ SPATIAL MULTIPLEXING)

|      | Ch1 |
| ---- | --- |
| DTX  | 0   |
| N, N | 1   |
| N, A | −j  |
| A, N | j   |
| A, A | −1  |

A : ACK
N : NACK

MAPPING TABLE FOR 2 A/N BITS

| ACK(0) | ACK(1) | Ch1 | Ch2 |
|---|---|---|---|
| A | A | | -1 |
| A | N/D | -1 | |
| N/D | A | | 1 |
| N | N/D | 0 | |
| D | N/D | | 0 |

FIG.4B

MAPPING TABLE FOR 3 A/N BITS

| ACK(0) | ACK(1) | ACK(2) | Ch1 | Ch2 | Ch3 |
|---|---|---|---|---|---|
| A | A | A | | -1 | |
| N/D | A | A | | -j | |
| N/D | N/D | A | | | -1 |
| A | A | N/D | -1 | | |
| A | N/D | N/D | -j | | |
| N/D | N/D | N/D | j | | |
| N | N/D | N/D | | | |
| N/D | N | D | | | 1 |
| D | D | D | | | 0 |

FIG.4C

MAPPING TABLE FOR 4 A/N BITS

IMPLICIT RESOURCE DERIVED FROM CCE INDEX OF PDCCH ON PCell
EXPLICIT RESOURCE INDICATED BY ARI

| ACK(0) | ACK(1) | ACK(2) | ACK(3) | Ch1 | Ch2 | Ch3 | Ch4 |
|---|---|---|---|---|---|---|---|
| A | A | A | A | | -1 | | |
| N/D | A | A | A | | -j | -j | |
| N/D | N/D | A | A | | | -j | -1 |
| A | A | A | N/D | | -j | | |
| A | N/D | A | N/D | | 1 | 1 | |
| N/D | N/D | A | N/D | | | -1 | |
| A | A | N/D | N/D | | | -1 | -j |
| A | N/D | N/D | N/D | -1 | | | |
| N/D | A | N/D | N/D | -j | | | |
| N/D | N/D | N/D | A | | | | 1 |
| N/D | N/D | N/D | N/D | 1 | | | |
| N | N | N/D | N/D | 1 | | | |
| D | D | N/D | N/D | 0 | 0 | 0 | 0 |

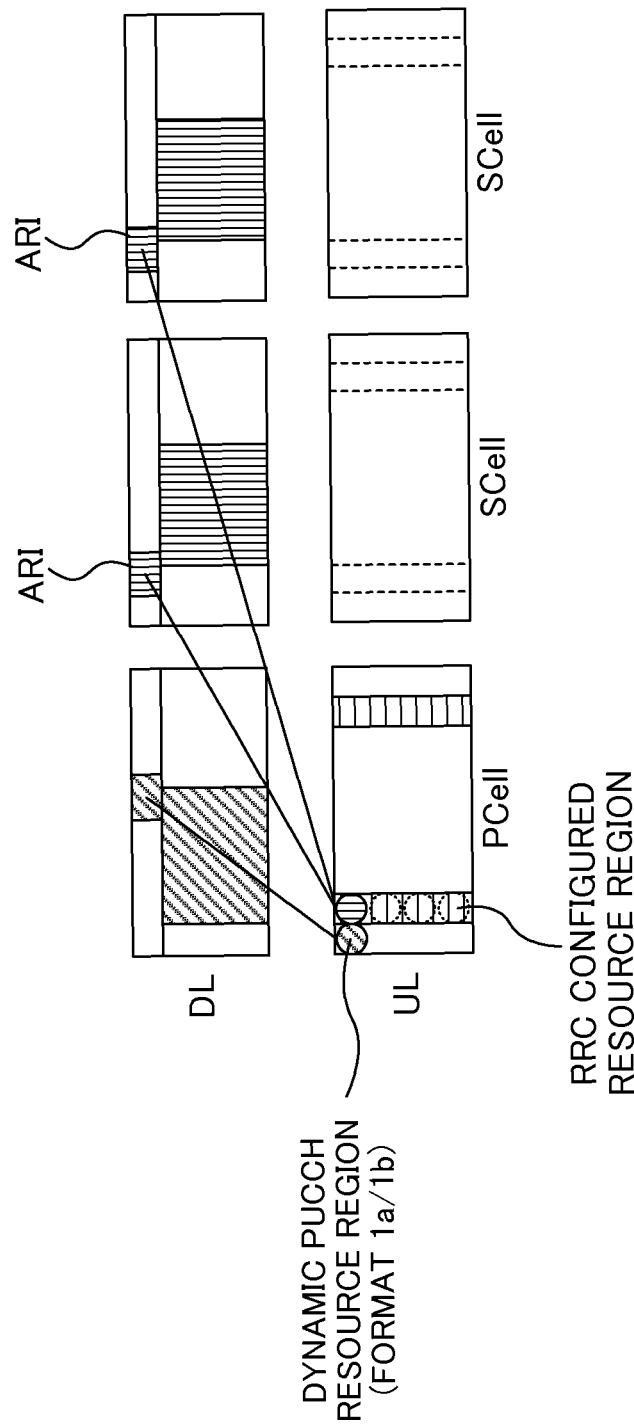

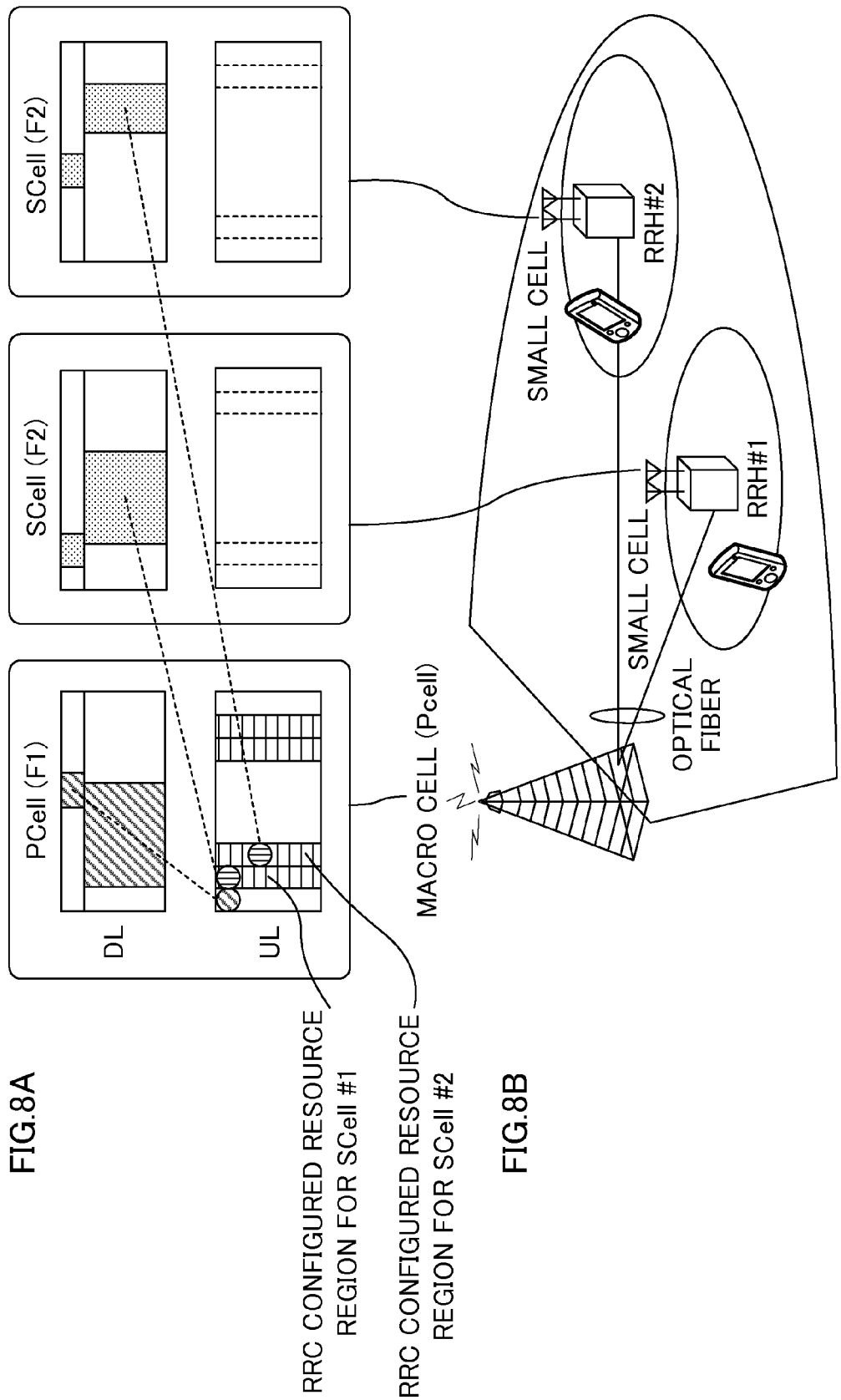

IN 2-CELL CASE(CHANNEL SELECTION)

IN 3 OR MORE-CELL CASE

… (1)

USER TERMINAL RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In a UMTS (Universal Mobile Telecommunications System) network, for the purposes of improving spectral efficiency and improving peak data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further improving spectral efficiency, increasing peak data rates, providing low delay and so on, long-term evolution (LTE) has been under study (see Non Patent Literature 1).

In LTE, unlike in W-CDMA, as multi access schemes, an OFDMA (Orthogonal Frequency Division Multiple Access)-based system is adopted for the downlink and an SC-FDMA (Single Carrier Frequency Division Multiple Access)-based system is adopted for the uplink.

Signals to be transmitted on uplink are, as illustrated in FIG. 1, mapped to appropriate radio resources and transmitted from a user terminal (UE (User Equipment) #1, UE #2) to a radio base station. In this case, user data is allocated to an uplink shared channel (PUSCH: Physical Uplink Shared Channel). Control information is multiplexed with the PUSCH when being transmitted simultaneously with the user data, or is allocated to an uplink control channel (PUCCH: Physical Uplink Control Channel) when the control information is only transmitted.

The control information to be transmitted on uplink includes downlink quality information (CQI: Channel Quality Indicator), transmission acknowledgement signals (ACK/NACK) in response to downlink shared channel (PDSCH: Physical Downlink Shared Channel) signals.

In a third-generation system (W-CDMA), it is possible to achieve a transmission rate of maximum approximately 2 Mbps on the downlink by using a fixed band of approximately 5 MHz. In an LTE system, it is possible to achieve a transmission rate of about maximum 300 Mbps on the downlink and about 75 Mbps on the uplink by using a variable band which ranges from 1.4 MHz to 20 MHz. In the UMTS network, successor systems to LTE are also under study for the purposes of further improving spectral efficiency and increasing peak data rates (for example, which may be called "LTE advanced" or "LTE enhancement" (hereinafter referred to as "LTE-A")).

Further, in the LTE-A system, study has been made about HetNet (Heterogeneous Network) in which a small cell (for example, pico cell, femto cell, RRH or the like) having a local coverage of about several ten-meters radius is arranged within a macro cell having a wide coverage of several-kilometer radius (for example, non-patent literature 2). HetNet is a radio communication system in which the macro cell and the small cell are arranged at least partially in an overlapping manner.

CITATION LIST

Non-Patent Literature

Non-Patent Literature 1: 3GPP, TR 25.912 (V7.1.0), "Feasibility study for Evolved UTRA and UTRAN", September 2006

Non-Patent Literature 2: 3GPP TR 36.814 "E-UTRA Further advancements for E-UTRA physical layer aspects"

SUMMARY OF INVENTION

Technical Problem

In the LTE-A system, there has been studied carrier aggregation (CA) in which a plurality of fundamental frequency blocks (CCs: component carriers) of different frequency bands are aggregated into a wide band. In the LTE-A system, in order to achieve broadbandization while maintaining backward compatibility with the LTE system, it has been agreed that a single fundamental frequency block is a frequency band (for example, 20 MHz) available to the LTE system.

In addition, in the uplink of the LTE-A system, application of SC-FDMA as a radio access scheme has been studied. As such, it has been considered that feedback control information (CQI, ACK/NACK etc.) in response to downlink signals transmitted on a plurality of CCs is transmitted using a single CC so as to maintain the performance of uplink single carrier transmission.

In this case, as the feedback control information in response to the downlink signals on the plural downlink CCs is increased as simply multiplied by the number of CCs, there is a need to transmit feedback control information in a greater number of bits from a single CC in accordance with increase in CCs using CA. Therefore, it has been also studied that transmission of feedback control information is performed appropriately by selecting an uplink control channel format (PUCCH format) to apply in accordance with the number of CCs (the number of cells).

On the other hand, when CA is performed between a macro cell and a small cell in HetNet, as described above, it has been considered that feedback control information is transmitted selectively from an uplink CC of a single cell (for example, macro cell). In this case, for example, if transmission acknowledgement signals in response to PDSCH signals transmitted on downlink CCs of the respective cells are fed back on an uplink CC of the macro cell, there increase PUCCH resources arranged on the uplink CC of the macro cell in accordance with the number of small cells within the macro cell and the number of downlink CCs.

The present invention was carried out in view of the foregoing and aims to provide a user terminal, a radio base station and a radio communication method capable of appropriate control of feedback control information in uplink transmission even when carrier aggregation is applied in HetNet.

Solution to Problem

The present invention provides a user terminal that is able to communicate with a plurality of radio base stations having overlapping coverage areas by using carrier aggregation, the user terminal comprising: a reception section that receives downlink shared channel signals using component carriers of a primary cell and a secondary cell; a generating section that generates transmission acknowledgement signals in response to the downlink shared channel signals; and an allocating section that allocates the transmission acknowledgement signals to predetermined uplink control channel resources, wherein the allocating section allocates the transmission acknowledgement signals to either or both of uplink control channel resources of the primary cell and uplink control channel resources of the secondary cell in accordance with contents of the transmission acknowledgement signals and/or an uplink control channel format.

Advantageous Effects of Invention

According to the present invention, it is possible to control feedback control information appropriately in uplink transmission when carrier aggregation is applied in HetNet.

BRIEF DESCRIPTION OF DRAWINGS

FIG. 3 provides diagrams illustrating mapping tables of transmission acknowledgement signals defined in PUCCH format 1a/1b in LTE (Rel. 8);

FIG. 4 provides diagrams each illustrating an example of mapping table applied to transmission of transmission acknowledgement signals;

FIG. 7 is a diagram for explaining allocation of PUCCH resources when transmission acknowledgement signals are transmitted using PUCCH format 3;

FIG. 8 provides diagrams for explaining carrier aggregation in HetNet;

DESCRIPTION OF EMBODIMENTS

A user terminal is able to transmit a transmission acknowledgement signal (ACK/NACK) of a downlink shared channel (PDSCH) signal, using an uplink control channel (PUCCH). The transmission acknowledgement signal (retransmission response signal) is expressed as a positive response (ACK: Acknowledgement) indicating that a transmission signal is received properly and a negative response (NACK: Negative Acknowledgement) indicating that a transmission signal is not received properly.

A radio base station recognizes successful transmission of a PDSCH signal by ACK and also recognizes error detection in a PDSCH signal by NACK. Besides, when reception power of a radio resource allocated to a transmission acknowledgement signal on uplink is a predetermined value or less, the radio base station determines DTX (Discontinuous Transmission). DTX is a determination result that ACK nor NACK is not transmitted from a user terminal and means that the user terminal could not receive a downlink control channel (PDCCH) signal.

Figure 1:
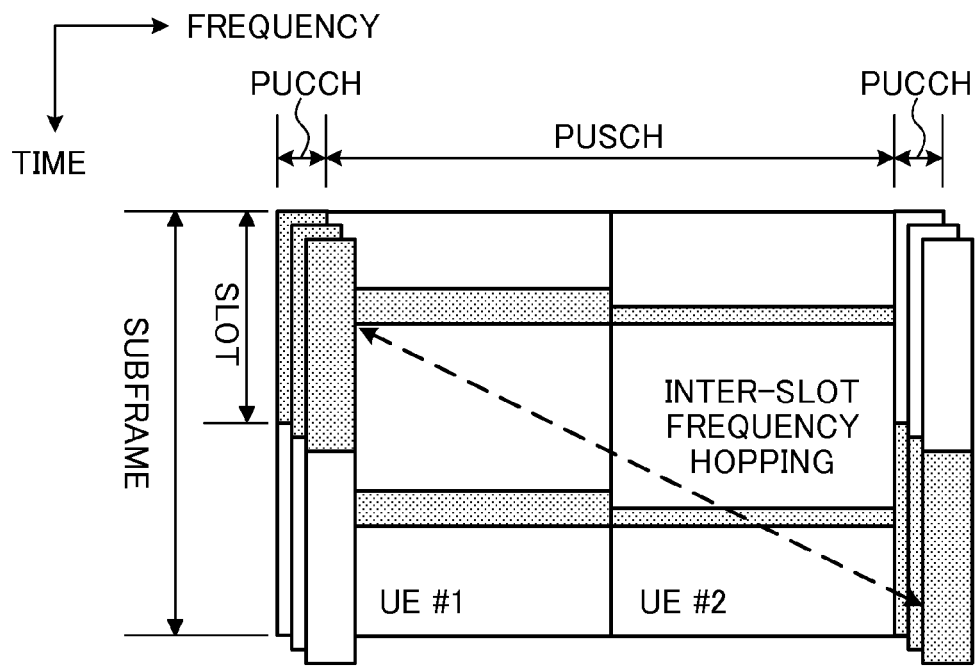
FIG. 1 is a diagram for explaining a channel configuration for mapping uplink signals.
Figure 2:
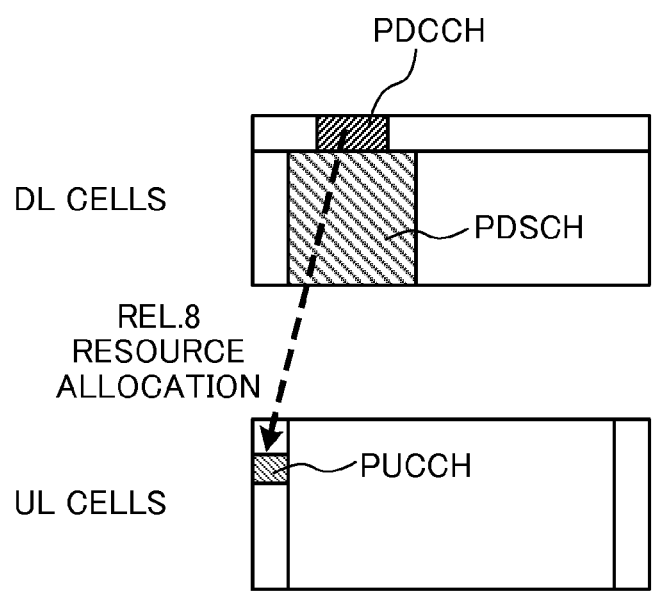
FIG. 2 is a schematic diagram for explaining radio resources for transmission acknowledgement signals in an LTE (Rel. 8) system.

The user terminal can determine a PUCCH resource to allocate with a transmission acknowledgement signal by a parameter configured by higher layer signaling (for example, RRC signaling), a control channel element (CCE) index of PDCCH, and an enhanced control channel element (ECCE) index of enhanced PDCCH (E-PDCCH) (see FIG. 2). For the PUCCH resources, for example, orthogonal cover code (OCC), cyclic shift (CS), resource block (RB) index and so on may be used. The user terminal multiplexes a transmission acknowledgment signal to a predetermined PUCCH resource and feeds it back to the radio base station.

In addition, in LTE (Rel. 8), a notification format (PUCCH format 1a/1b) of a transmission acknowledgement signal of a downlink shared channel (PDSCH) signal is defined (see FIG. 3)

In one-codeword (1 CW) transmission (1 transport block (1 TB)), three states "ACK", "NACK" and "DTX" are defined (see FIG. 3A) and in two-codeword (2 CW) transmission (2 transport blocks (2 TB)), five states "ACK, ACK", "ACK, NACK", "NACK, ACK", "NACK, NACK" and "DTX" are defined (see FIG. 3B). In the following description, "ACK" is also expressed as "A", "NACK" is also expressed as "N" and "DTX" is also expressed as "D".

In the mapping table in FIG. 3, "0" indicates that the user terminal does not transmit information to the radio base station in this subframe, and "1", "−1", "j" and "−j" indicates their respective phase states. For example, in FIG. 3A, "1" and "−1" correspond to "0" and "1", respectively, and are able to indicate 1-bit information. In FIG. 3B, "1", "−1", "j" and "−j" correspond to "00", "11", "10" and "01" data and are able to indicate 2-bit information. Accordingly, in PUCCH format 1a/1b, maximum 2-bit transmission acknowledgement signals are able to be transmitted.

On the other hand, in the LTE-A system, in order to maintain uplink single carrier transmission properties, it has been studied that transmission acknowledgement signals in response to PDSCH signals transmitted on a plurality of downlink CCs are fed back on PUCCH of a specific CC (primary cell). Further, in the LTE-A system, feedback of transmission acknowledgement signals using PUCCH format 1a/1b and a plurality of PUCCH resources (phase state information and position information of PUCCH resources) has been studied (channel selection or PUCCH format 1a/1b with channel selection). In channel selection, a mapping table is agreed in which combinations of transmission acknowledgement signals of plural CCs are defined by phase state information and position information of PUCCH resources.

<Channel Selection>

At present, in the FDD scheme in the LTE-A system, there is agreement in using channel selection in 2 CCs. FIG. 4 provides views each illustrating an example of a mapping table using channel selection when carrier aggregation is performed in 2 CCs (primary cell (PCell) and secondary cell (SCell)). The mapping table depends on the number of ACK/NACK bits, and this bit number is determined based on the transmission mode (TB number, CW number or the like) and the number of CCs configured by higher layer signaling (for example, RRC signaling).

FIG. 4A illustrates configuring two PUCCH resources (Ch1 and Ch2) for PUCCH format 1b (the case where PCell and SCell both adopt 1 CW). FIG. 4B illustrates configuring three PUCCH resources (Ch1 to Ch3) for PUCCH format 1b (the case where one of PCell and SCell adopts 1 CW and the other adopts 2 CWs). FIG. 4C illustrates configuring four PUCCH resources (Ch1 to Ch4) for PUCCH format 1b (the case where PCell and SCell both adopt 2 CWs).

For radio resources (for example, Ch1 to Ch4) in the mapping table, orthogonal cover code (OCC), cyclic shift (CS), resource block (RB) index and the like may be used like in the LTE system.

The user terminal determines a PUCCH resource (any of Ch1 to Ch4) to use in transmission of transmission acknowledgement signals based on a combination of transmission acknowledgement signals (ACK/NACK) of PDSCH signals per CC and a mapping table illustrated in FIG. 4. For example, when PCell and SCell both adopt 2 CWs, "NACK, ACK" are fed back as transmission acknowledgement signals of PDSCH signals of PCell and "ACK, ACK" are fed back as transmission acknowledgement signals of PDSCH signals of SCell, QPSK modulation symbol "−j" in PUCCH resource (Ch2) is used (see FIG. 4C).

As for PUCCH resources in channel selection, for example, referring to the mapping table in FIG. 4C, the PUCCH resource (for example, Ch1, Ch2) may be designated using CCE index (for example, the smallest number) of PDCCH in PCell.

Figure 5:
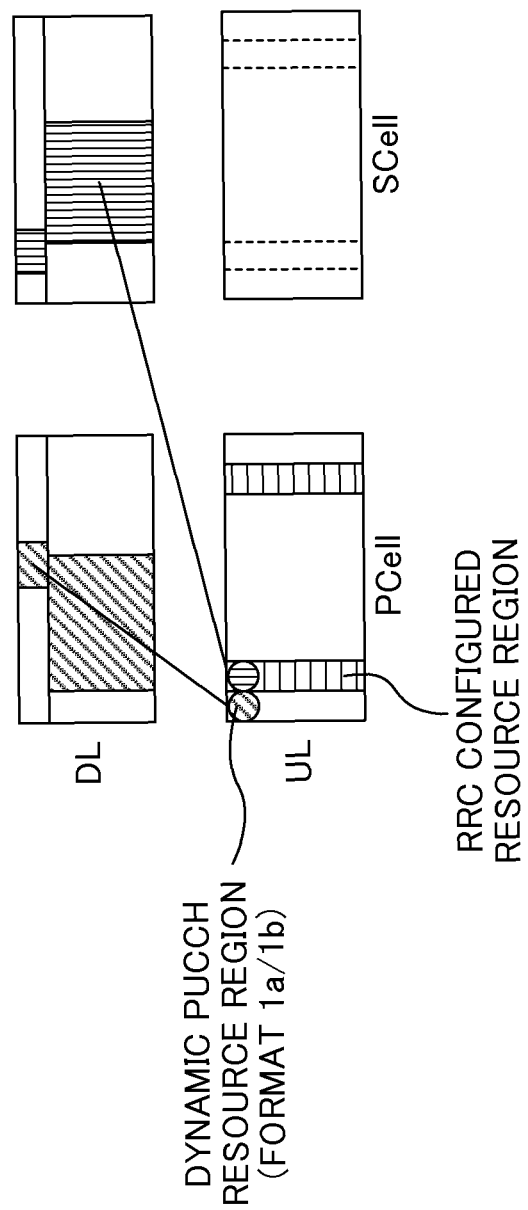
FIG. 5 is a diagram for explaining allocation of PUCCH resources to use in transmission of transmission acknowledgement signals.

In addition, other PUCCH resources (For example, Ch3, Ch4) may be designated using higher layer signaling (for example, RRC signaling) and downlink control information (DCI) (see FIG. 5). Specifically, the user terminal is notified, by higher layer signaling, of four sets each having one or two PUCCH resources (for example, Ch3, Ch4) for uplink PCell. Then, a predetermined PUCCH resource is dynamically designated from the plural PUCCH resources, using ACK/NACK resource indicator (ARI) included in the downlink control information to schedule PDSCH for SCell.

Here, ARI is identification information to dynamically designate a PUCCH resource to use for a transmission acknowledgement signal. For example, the radio base station allocates a plurality of (for example, four) PUCCH resources to each user terminal by RRC signaling and designates a predetermined PUCCH resource dynamically from these plural PUCCH resources by using ARI. The bit field to define ARI is replaced with a TPC command field (2 bits) in PDCCH of SCell.

<PUCCH Format 3>

Figure 6:
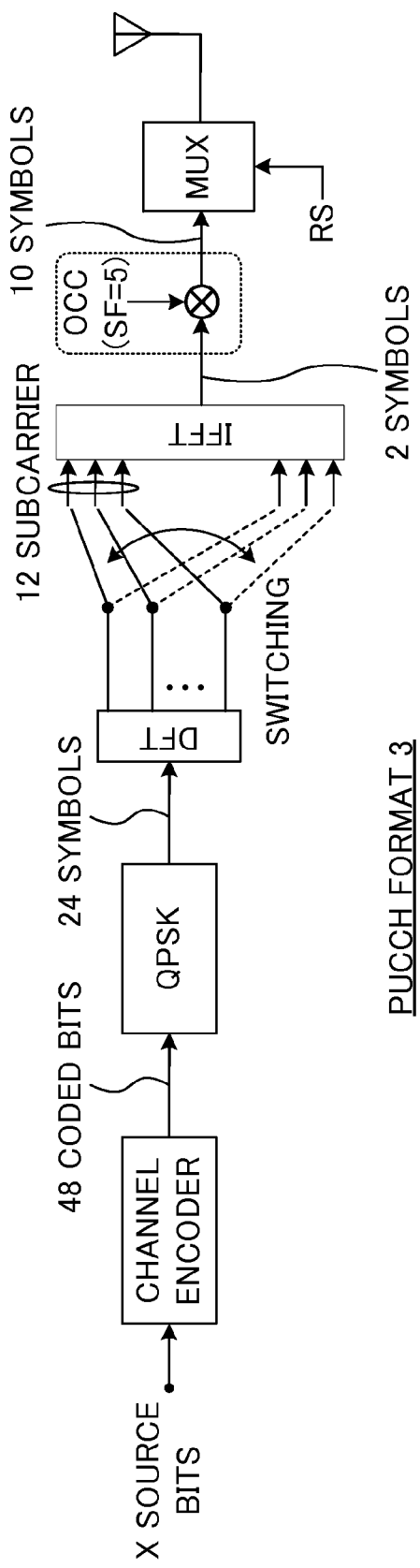
FIG. 6 is a diagram for explaining PUCCH format 3.

In LTE-A, there is newly defined a PUCCH format 3 for transmitting a plurality of ACK/NACK bits. In the PUCCH format 3, like PDSCH, a signal is generated by DFT (Discrete Fourier Transform)-base precoding and different UEs may be multiplexed by OCC (Orthogonal Cover Code) (see FIG. 6). Specifically, ACK/NACK signals of a plurality of cells are subjected to channel coding and output as 48-bit data per subframe. The output 48-bit sequence is subjected to phase shift modulation (QPSK) into 24 symbols and then subjected to DFT processing.

When PUCCH format 3 is applied, maximum 10 ACK/NACK signals are supported in the FDD system and ACK/NACK of maximum 20 bits is supported in the TDD system. That is, the PUCCH format 3 is preferably used as a format for ACK/NACK feedback of a plurality of cells (for example, three cells or more in FDD) under application of CA.

PUCCH resources to use in PUCCH format 3 may be configured by the radio base station notifying the user terminal explicitly. For example, the radio base station allocates a plurality of PUCCH resources (for example, four resources) to PCell on uplink and notifies the user terminal by RRC signaling. In addition, in PDCCH signals corresponding to PDSCH signals to transmit in SCell on downlink, TPC command field (for example, in 2 bits) is used as ARI field (see FIG. 7).

That is, the radio base station is able to dynamically allocate one PUCCH resource of a plurality of PUCCH resources that are given by RRC signaling using ARI. When the user terminal does not receive any PDCCH signal of SCell containing ARI, the user terminal is able to select PUCCH resources using a CCE index of PDCCH of PCell (like in the PUCCH format 1a/1b in Rel. 8).

Thus, as the PUCCH format (PUCCH format 1a/1b, channel selection, PUCCH format 3, etc.) is selected in accordance with the number of cells in CA (the number of ACK/NACK bits), feedback of transmission acknowledgement signals of plural CCs is able to be performed appropriately.

<HetNet CA>

Here, in Rel. 12 or later, carrier aggregation in HetNet has been studied and allocation of PUCCH radio resources of transmission acknowledgement signals in this case becomes an issue. The following description is made about allocation of PUCCH resources when CA is applied in HetNet.

FIG. 8B is a conceptual view of HetNet. As illustrated in FIG. 8B, HetNet is a radio communication system in which a plurality of small cells are arranged in a geographically overlapping mapper over a macro cell. Here, the system includes a radio base station forming a macro cell (hereinafter also referred to as "macro base station"), radio base stations each forming a small cell (hereinafter also referred to as "small base station"), a user terminal performing communication with at least one of the macro base station and the small base stations.

As illustrated in FIG. 8, the macro cell uses a relatively low frequency band, carrier F1, of 800 MHz or 2 GHz, for example, and a plurality of small cells S use a relatively high frequency band, carrier F2, of 3.5 GHz, for example. The macro base station may be called eNodeB (eNB), macro eNB (MeNB), transmission point or the like. The small base station may be called a pico eNB, femto eNB, RRH (Remote Radio Head), transmission point or the like. The macro base station and each small base station may be configured to be connected, for example, by an optical fiber, X2 interface or wireless link.

Here, in the study up to Rel. 11, carrier aggregation within a base station (intra-eNB CA) is only supported and in such a case, the macro base station and the small base station adopt CA, for example, via the optical fiber. In this case, as described above, transmission acknowledgement signals are aggregated to be fed back on PUCCH of uplink CC of the primary cell (for example, macro cell).

However, as illustrated in FIG. 8B, when there are a plurality of small cell (RRHs) in a coverage area of the macro cell, transmission acknowledgement signals of the plural small cells (RRH #1 (SCell #1), RRH #2 (SCell #2)) using the same CC as the macro cell (PCell) are allocated to uplink PUCCH resource of the macro cell. In this case, the number of SCells increases as increase in the number of small cells, the PUCCH resources of PCell required for allocation of transmission acknowledgement signals also increase (see FIG. 8A).

Then, the present inventors have found that in HetNet CA, it is possible to minimize increase of PUCCH resources in PCell by arranging, as PUCCH resources to allocate with transmission acknowledgement signals, PUCCH resources in SCell in addition to PUCCH resources PCell.

Specifically, as PUCCH resource candidates to allocate with transmission acknowledgement signals, not only PCell but also SCell is considered and the user terminal allocates transmission acknowledgement signals to either or both of PUCCH resource of PCell and PUCCH resource of SCell in accordance with contents of the transmission acknowledgement signals and/or uplink control channel format to use and so on.

Hereinafter, the embodiment will be described in detail with reference to the drawings. In the following description, HetNet carrier aggregation may be embodied as intra-eNB CA and inter-eNB CA, each of which will be described below.

<Intra-eNB CA>

Intra-eNB CA is performed in the HetNet configuration such that a communication control section (for example, a BB (Baseband) processing section, a scheduling section or the like) is only provided in the macro base station. In this HetNet configuration, the macro base station and the small base station are connected by optical fibers. In addition, the macro base station controls communication using a low frequency band carrier F1 in the macro cell and communication using a high frequency band carrier F2 in the small cell.

In Intra-eNB CA, conventionally, it is configured that transmission acknowledgement signals in response to PDSCH signals to be transmitted in CCs of the primary cell (for example, macro cell) and CCs of the secondary cell (for example, small cell) are aggregated on the PUCCH resource of the primary cell.

In this embodiment, when performing intra-eNB CA in HetNet, PUCCH resources are also arranged in the SCell and the user terminal uses, as the PUCCH resource to allocate with transmission acknowledgement signals, the PUCCH resources of the primary cell and the PUCCH resources of the secondary cell. The user terminal selects the PUCCH resource of either of the primary cell and the secondary cell based on the contents of the transmission acknowledgement signals and/or uplink control channel format to apply and allocates the transmission acknowledgement signals. In the following, the method for allocating PUCCH resources in intra-eNB CA will be described as to 2-Cell case and 3 or more-Cell case.

(2-Cell Case)

Figure 9A:
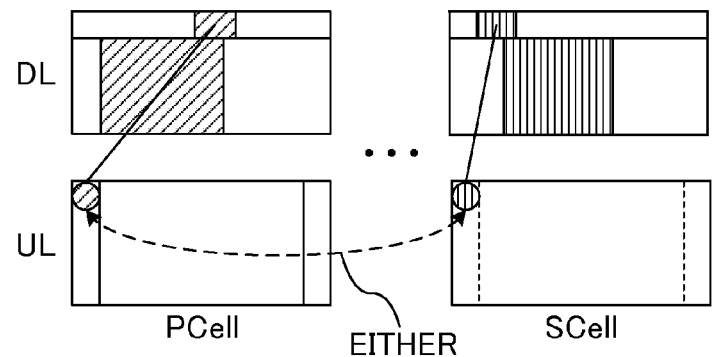
FIG. 9 provides diagrams each illustrating an example of PUCCH resources allocated when using intra-eNB carrier aggregation in HetNet.

When intra-eNB CA is performed in 2 Cells, the PUCCH resources to allocate with transmission acknowledgement signals may be configured by using (reusing) channel selection in Rel. 10. In the present embodiment, the PUCCH resources of the primary cell configured by RRC signaling in channel selection of Rel. 10 are replaced with the PUCCH resources of the secondary cell (see FIG. 9A).

For example, when three PUCCH resources (Ch1 to Ch3) are configured as illustrated in FIG. 4B mentioned above, Ch1 and Ch2 are configured based on the CCE index of the PDCCH in the primary cell like in Rel. 10 (when the primary cell adopts 2 CWs). On the other hand, in Ch3, not the PUCCH resources of the primary cell (configured by RRC signaling), but PUCCH resources of the secondary cell may be configured based on the CCE index of the PDCCH corresponding to the PDSCH of the secondary cell.

In addition, as illustrated in FIG. 4C, when four PUCCH resources (Ch1 to Ch4) are configured, Ch1 and Ch2 are configured based on the CCE index of the PDCCH in the primary cell like in Rel. 10. On the other hand, in Ch3 and Ch4, not the PUCCH resources of the primary cell (configured by RRC signaling), but PUCCH resources of the secondary cell may be configured based on the CCE index of the PDCCH corresponding to the PDSCH of the secondary cell.

That is, in the channel selection, the PUCCH resources of the PCell (Ch1, Ch2) and the PUCCH resources of the S Cell (Ch3, Ch4) are configured as plural PUCCH resources as candidates to allocate with transmission acknowledgement signals. The user terminal selects a predetermined PUCCH resource from a plurality of PUCCH resources (Ch1 to Ch4) with reference to the mapping table, based on the contents of the transmission acknowledgement signals of CW of each cell (CC). Then, the selected PUCCH resource is mapped with transmission acknowledgement signals, and fed back to the radio base station (for example, macro base station).

Here, when the user terminal receives PDCCH only from the primary cell (for example, when the user terminal does not receive PDCCH of the secondary cell in a subframe), the user terminal selects the PUCCH resource of the primary cell using the CCE index of the PDCCH of the primary cell. In this case, the radio base station (for example, macro base station) detects transmission acknowledgement signals based on the PUCCH resource candidates (for example, Ch1, Ch2) in the primary cell and thereby is able to perform retransmission control processing.

In addition, when receiving PDCCH only from the secondary cell (not receiving PDCCH of the primary cell in a certain subframe), the user terminal selects the PUCCH resource of the secondary cell using CCE index of the PDCCH of the secondary cell. In this case, the radio base station (for example, macro base station) detects transmission acknowledgement signals based on the PUCCH resource candidates in the secondary cell (for example, Ch3, Ch4) and thereby is able to perform retransmission control processing.

Further, when receiving PDCCHs from both of the primary cell and the secondary cell, the user terminal selects a predetermined PUCCH resource of the primary cell or secondary cell in accordance with contents of the transmission acknowledgement signals. In this case, the radio base station (for example, macro base station) detects transmission acknowledgement signals based on the PUCCH resource candidates in the primary cell and the secondary cell (for example, Ch1, Ch2, Ch3, Ch4) and thereby is able to perform retransmission control processing.

Here, the PUCCH resources of the primary cell (Ch1, Ch2) may be determined based on the CCE index of the PDCCH of the primary cell, like in Rel. 10. The PUCCH resources of the secondary cell (Ch3, Ch4) may be determined based on the CCE index of the PDCCH of the secondary cell, like in the primary cell of Rel. 10.

Thus, when intra-eNB CA is performed in 2 Cells, transmission acknowledgement signals of the respective cells (CCs) are aggregated into either of the PUCCH of the primary cell or the PUCCH of the secondary cell and fed back. Thus, even when the PUCCH resources in the secondary cell are used, it is possible to prevent simultaneous transmission on uplink in the primary cell and secondary cell by using the mapping table for channel selection (see FIG. 9A). Further, as compared with channel selection in Rel. 10, it is possible to eliminate the necessity of the PUCCH resources of the primary cell configured by RRC signaling.

Thus, as the PUCCH resources of PCell and SCell are used as plural PUCCH resources that become candidates to allocate with transmission acknowledgement signals, even when intra-cell CA is performed in HetNet, it is possible to minimize increase of the PUCCH resources of the PCell required for allocation of the transmission acknowledgement signals.

(3 or More-Cell Case)

Figure 9B:
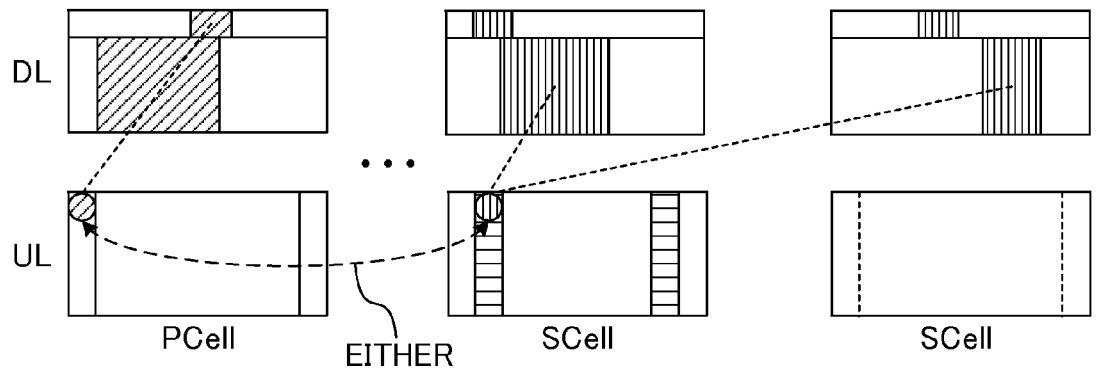

When intra-eNB CA is performed in 3 or more -Cell case, it is possible to use (reuse) the already defined PUCCH format 3 as PUCCH resources to allocate with transmission acknowledgement signals. In the present embodiment, the PUCCH resource of a secondary cell is used in place of the PUCCH resource of the primary cell configured by RRC signaling in the PUCCH format 3 in Rel. 10 (see FIG. 9B).

For example, the radio base station configures a plurality of resources (for example, four resources) in SCells on uplink of each user terminal, using higher layer signaling (for example, RRC signaling) and notifies the user terminal. Besides, the radio base station is able to dynamically allocate one PUCCH resource of a plurality of PUCCH resources of the SCells configured by higher layer signaling, using ARI. The radio base station is able to notify the user terminal of ARI by including the ARI in the PDCCH of the S Cell.

Further, when not receiving any PDCCH of SCells including ARI (for example, when receiving PDCCH only from the primary cell in a certain subframe), the user terminal is able to select PUCCH resources using CCE index of the PDCCH of the PCell (using the PUCCH format 1a/ab). In this case, the radio base station detects transmission acknowledgement signals based on the PUCCH resource of the primary cell configured based on the CCE index of the PDCCH of the primary cell and is thereby able to perform retransmission control processing.

Furthermore, when receiving PDCCH only from a secondary cell (for example, when not receiving any PDCCH of the primary cell in a certain subframe), the user terminal selects one PUCCH resource that is designated by ARI from PUCCH resources of the secondary cells (using the PUCCH format 3). In this case, the radio base station (for example, the macro base station) detects transmission acknowledgement signals based on the predetermined PUCCH resource of the secondary cell and is thereby to be able to perform retransmission control processing.

Furthermore, when receiving the PDCCHs from the primary cell and the secondary cells, the user terminal selects one PUCCH resource that is designated by ARI from the PUCCH resources of the secondary cells (using the PUCCH format 3). In this case, the radio base station (for example, macro base station) detects transmission acknowledgement signals based on the predetermined PUCCH resources of the secondary cell and the primary cell and is thereby able to perform retransmission control processing.

Thus, when intra-eNB CA is performed in the 3 or more-Cell case, if the PDCCH is received only from the primary cell, the PUCCH of the primary cell is used, and otherwise, the transmission acknowledgement signals of the cells (CCs) are aggregated into the PUCCH of the secondary cell and fed back. Thus, it is possible to avoid simultaneous transmission on uplink of the primary cell and the secondary cell (see FIG. 9B). Besides, as compared with the PUCCH format 3 in Rel. 10, the transmission acknowledgement signals are allocated to the PUCCH resources of the secondary cell.

Thus, as the PUCCH resources of the respective SCells are used as plural PUCCH resources that become candidates to allocate with transmission acknowledgement signals when using the PUCCH format 3, even when intra-cell CA is performed in HetNet, it is possible to minimize increase of the PUCCH resources of the PCell required for allocation of the transmission acknowledgement signals.

<Inter-eNB CA>

Inter-eNB CA is performed in HetNet configuration where both of the macro base station and the small base station are provided with communication control sections (for example, BB (baseband) processing sections and scheduling sections, etc.). In this HetNet configuration, the macro base station and the small base station are connected to each other by linkage such as X2 interface (irrespective of wire or wireless). Therefore, dynamic coordination cannot be expected between the macro base station and the small base station, and HARQ and other processing are required to be performed in each base station. In addition, the macro base station controls communication using a low frequency band carrier F1 in the macro cell and the small base station controls communication using a high frequency band carrier F2 in the small cell.

In inter-eNB CA, the user terminal generates transmission acknowledgement signals of PDSCH signals received on downlink CCs from the macro cell and the small cell, and feeds the transmission acknowledgement signals back using the PUCCHs on uplink CCs of the macro cell and the small cell. In other words, in inter-eNB CA, it is necessary to perform transmission of transmission acknowledgement signals from the user terminal to each of the radio base stations per CC or per radio base station in parallel. In the following, the method for allocating PUCCH resources in inter-eNB CA will be described as to the 2-Cell case and the 3 or more-Cell case.

(2-Cell Case)

Figure 10A:
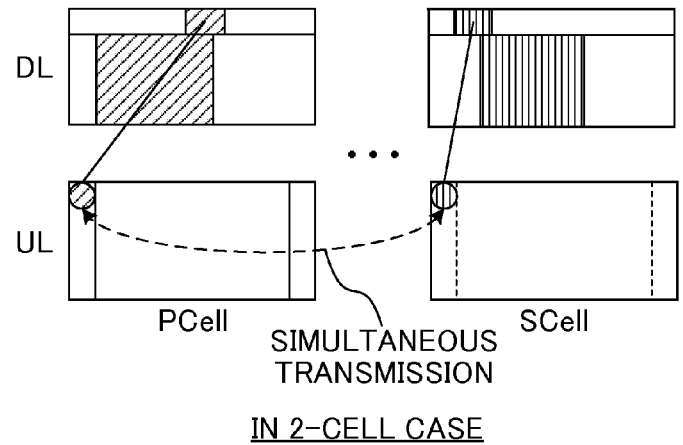
FIG. 10 provides diagrams each illustrating an example of PUCCH resources allocated when using inter-eNB carrier aggregation in HetNet.

When inter-eNB CA is performed in 2-Cell case, it is possible to use (reuse) the mechanism of the PUCCH format 1a/1b in up to Rel. 10 as PUCCH resources to allocate with transmission acknowledgement signals. In this embodiment, either or both of the PUCCH resource of the primary cell and the PUCCH resource of the secondary cell are used (see FIG. 10A).

That is, the PUCCH resources (Ch1, Ch2) of the PCell and the PUCCH resources of the SCell (Ch3, Ch4) are configured as PUCCH resources that become candidates to allocate with transmission acknowledgement signals. The user terminal allocates transmission acknowledgement signals of the respective PDSCHs to PUCCH resources of the respective cells and feeds them back to the respective radio base stations, using the PUCCH format 1a/1b. In this case, the PUCCH resources of each cell may be configured based on the CCE index of the PDCCH of the cell. The user terminal selects a predetermined PUCCH resource based on the contents of the transmission acknowledgement signals per cell.

When receiving PDCCH only from the primary cell (for example, not receiving the PDCCH of the secondary cell in a certain subframe), the user terminal selects the PUCCH resource of the primary cell using the CCE index of the PDCCH of the primary cell. In this case, the radio base station (for example, the macro base station) detects transmission acknowledgement signals based on the PUCCH resource candidates in the primary cell (for example, Ch1, Ch2) and is thereby able to perform retransmission control processing.

In addition, when receiving the PDCCH only from the secondary cell (for example, when not receiving the PDCCH of the primary cell in a certain subframe), the user terminal selects the PUCCH resource of the secondary cell using CCE index of the PDCCH of the secondary cell. In this case, the radio base station (for example, the small base station) detects transmission acknowledgement signals based on the PUCCH resource candidates (for example, Ch3, Ch4) in the secondary cell and is thereby able to perform retransmission control processing.

Besides, when receiving the PDCCHs from both of the primary cell and the secondary cell, the user terminal selects predetermined PUCCH resources of the primary cell and the secondary cell respectively in accordance with the contents of the transmission acknowledgement signals of the respective cells. In this case, the radio base station (for example, macro base station) detects transmission acknowledgement signals based on the PUCCH resource candidates (Ch1, Ch2) in the primary cell and is thereby able to perform retransmission control processing. On the other hand, the radio base station (for example, small base station) detects transmission acknowledgement signals based on the PUCCH resource candidates (Ch3, Ch4) in the secondary cell and is thereby able to perform retransmission control processing.

Thus, when inter-eNB CA is performed in the 2-Cell case, transmission acknowledgement signals of the respective cells (CCs) are fed back on the respective PUCCHs of the primary cell and the secondary cell. Therefore, simultaneous transmission occurs on uplink between the primary cell and the secondary cell (see FIG. 10A). In addition, as compared with the channel selection in Rel. 10, it is possible to eliminate the need of PUCCH resources of the primary cell configured by RRC signaling.

(3 or More-Cell Case)

When inter-eNB CA is performed in 3 or more cells, feedback of transmission acknowledgement signals is not performed per cell. Instead, the predetermined cells are grouped and allocation of PUCCH resources of transmission acknowledgement signals is controlled per cell group. For example, a plurality of cells within the same base station may be grouped into one group. In the present embodiment, the plural cells are grouped and PUCCH format (PUCCH format 1a/1b, channel selection, PUCCH format 3, etc.) is selected appropriately in accordance with the number of cells within each cell group thereby to perform feedback of the transmission acknowledgement signals.

Figure 10B:
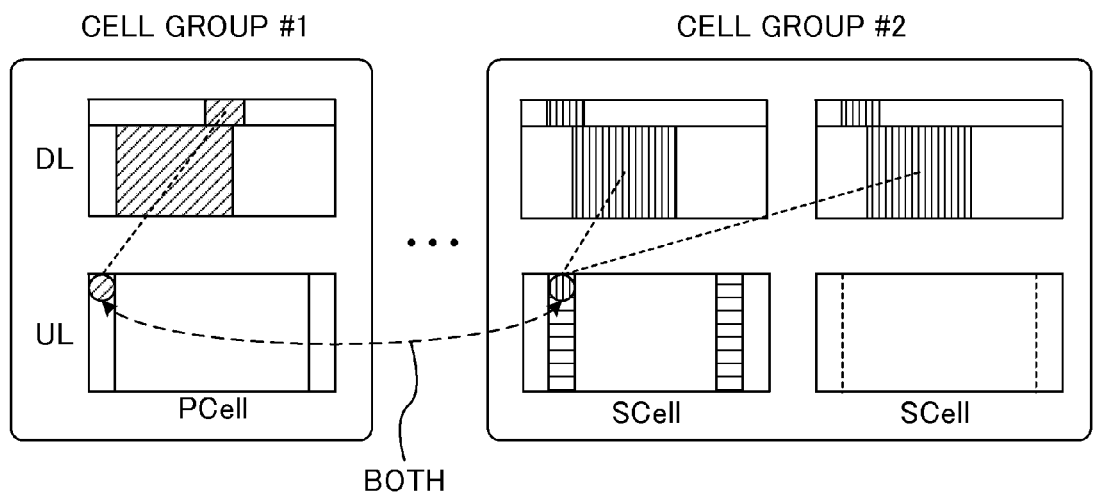

For example, when CA is performed in 3 or more cells, as illustrated in FIG. 10B, cells are classified by PCell (macro cell) and SCell (small cell) and a predetermined PUCCH format is used in accordance with the number of cells within each cell group. In the case illustrated in FIG. 10B, in the cell group #1 formed of the PCell (for example, macro cell), the number of cells is 1 and transmission acknowledgement signals to the PDSCHs of the PCell are fed back using PUCCH resource of the PCell. In this case, the PUCCH format 1a/1b may be used.

On the other hand, in the cell group #2 formed with SCell (for example, small cell), the number of cells is more than one (here, 2 cells), and therefore, feedback of transmission acknowledgement signals to PDSCHs of the plural SCells may use channel selection (PUCCH format 3 in the 3 or more-cell case).

In this case, in the cell group #2, the same applies as the above-mentioned intra-eNB CA, and therefore, the mechanism of intra-eNB CA mentioned above may be used. That is, in the cell group #2, the method for allocating PUCCH resources in Rel. 10 may be used, or as described above, the method for allocating PUCCH resources also using PUCCH resources of the secondary cell may be used. Specifically, when using the method for allocating the PUCCH resources in Rel. 10, the primary cell and the secondary cell may be defined in each cell group (which may be called sub-primary cell and sub-secondary cell). These sub-primary cell and sub-secondary cell may be configured by higher layer signaling. With this structure, the sub-primary cell is able to have a function equivalent to the primary cell within the cell group (base station).

Besides, in FIG. 10B, transmission acknowledgement signals of each cell group are fed back from the PUCCH of one cell within the cell group (primary cell, sub-primary cell). Therefore, simultaneous transmission may be performed on uplink between cell groups. On the other hand, within each cell group, transmission acknowledgement signals of the cells that constitute each cell group are aggregated into a predetermined cell and fed back. Therefore, it is possible to prevent simultaneous transmission between cells that constitute the same cell group.

Here, in FIG. 10B, classification into cell groups is performed based on the type of cell (PCell or SCell (macro cell or small cell)), however, the present embodiment is not limited to this.

(Radio Communication System)

Figure 11:
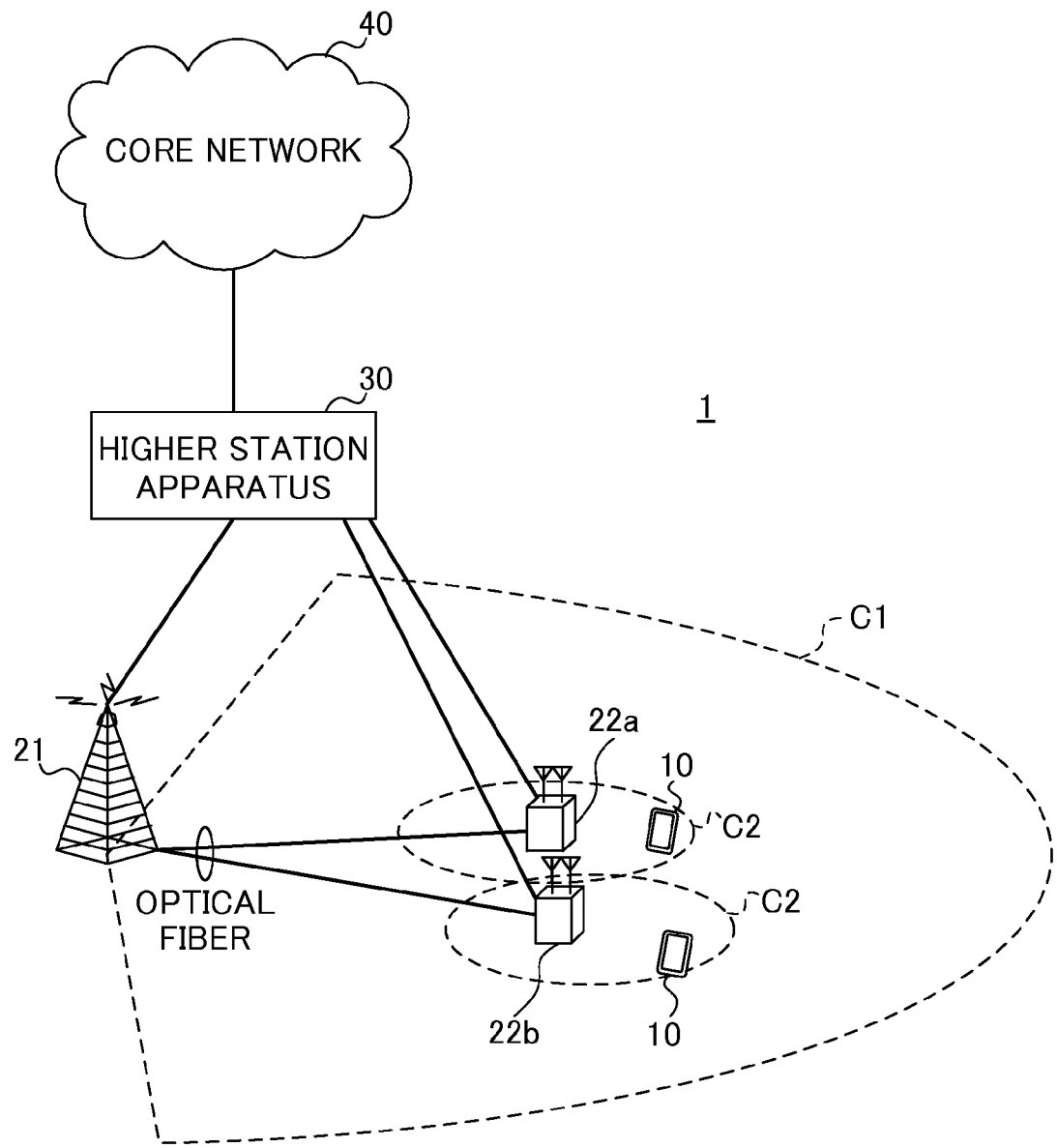
FIG. 11 is a diagram for explaining the configuration of a radio communication system having user terminals and radio base station apparatuses according to the present embodiment.

The following description is made in detail about the radio communication system according to the present embodiment. FIG. 11 is a diagram schematically illustrating the radio communication system according to the present embodiment. Here, the radio communication system illustrated in FIG. 11 is, for example, an LTE system or a system including SUPER 3G. In this radio communication system, carrier aggregation is adopted such that a plurality of basic frequency blocks (component carriers) are aggregated, each of the basic frequency blocks being a unit of a system band of the LTE system. In addition, this radio communication system may be called IMT-Advanced, 4G or FRA (Future Radio Access).

The radio communication system 1 illustrated in FIG. 11 has a radio base station 21 forming a macro cell C1, and radio base stations 22a and 22b arranged in the macro cell C1. The radio base stations 22a and 22b form small cells C2 that are smaller than the macro cell C1. In the macro cell C1 and each small cell C2, a user terminal 10 is arranged. The user terminal 10 is configured to be able to perform radio communication with both of the radio base station 21 and the radio base stations 22.

Communication between the user terminal 10 and the radio base station 21 is performed using a carrier of a relatively lower frequency band (for example, 2 GHz) and wide bandwidth. On the other hand, communication between the user terminal 10 and each radio base station 22 may be performed using a carrier of a relatively higher frequency band (for example, 3.5 GHz or the like) and narrow bandwidth, or the same carrier as that used in communication with the radio base station 21. The radio base station 21 and each radio base station 22 are connected wiredly or wirelessly.

The radio base station 21 and the radio base stations 22 are each connected to a higher station apparatus 30 and are connected to a core network 40 via the higher station apparatus 30. The higher station apparatus 30 includes, but is not limited to, an access gateway apparatus, a radio network controller (RNC), a mobility management entity (MME) and so on. Each of the radio base stations 22 may be connected to the higher station apparatus via the radio base station 21.

Here, the radio base station 12 is a radio base station having a relatively broader coverage, and may be called eNodeB, radio base station, transmission point or the like. The radio base station 22 is a radio base station having a local coverage and may be called pico base station, femto base station, Home eNodeB, RRH, micro base station, transmission or the like. In the following description, if the radio base stations 21 and 22 are not discriminated, they may be each called radio base station 20. Each user terminal 10 is a terminal supporting various communication schemes such as LTE, LTE-A and the like and may include a mobile communication terminal, but also a fixed or stationary communication terminal.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about communication channels used in the radio communication system illustrated in FIG. 11. Downlink communication channels include PDSCH that is used by each user terminal 10 on a shared basis and downlink L1/L2 control channels (PDCCH, PCFICH, PHICH, EPDCCH). The PDSCH is used to transmit user data and higher control information. The PDCCH is used to transmit PDSCH and PUSCH scheduling information and the like. The PCFICH (Physical Control Format Indicator Channel) is used to transmit the number of OFDM symbols used in the PDCCH. The PHICH (Physical Hybrid-ARQ Indicator Channel) is used to transmit HARQ ACK/NACK in response to PUSCH. And, the EPDCCH (enhanced PDCCH) may be used to transmit PDSCH and PUSCH scheduling information and the like. The EPDCCH may be allocated by being frequency-division-multiplexed with the PDSCH (downlink shared data channel).

Uplink communication channels include PUSCH as an uplink data channel that is used by each user terminal 10 on a shared basis and PUCCH as an uplink control channel. This PUSCH is used to transmit user data and higher control information. The PUCCH is used to transmit downlink radio quality information (CQI), transmission acknowledgement signals (ACK/NACK) and so on.

Figure 12:
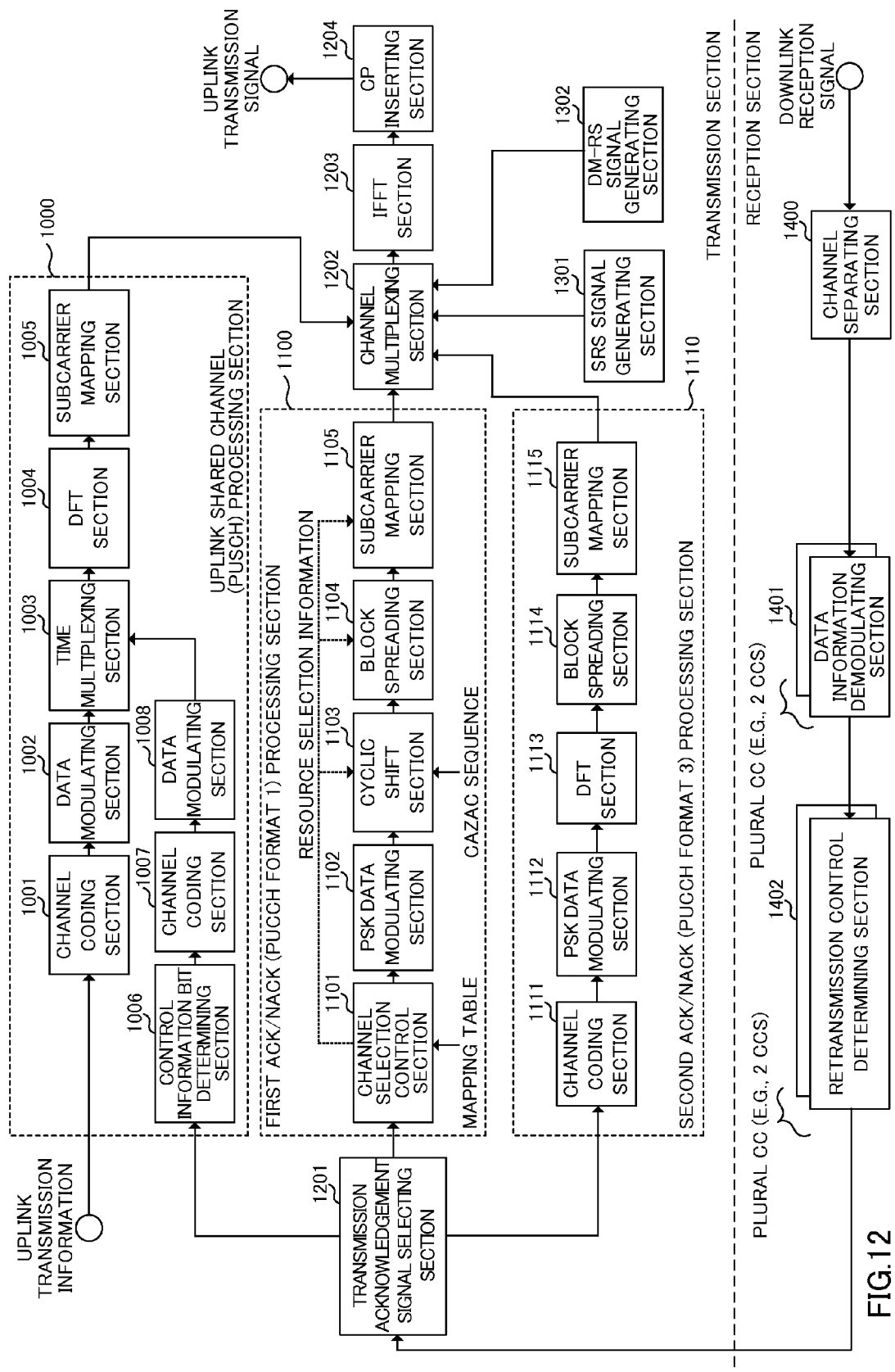
FIG. 12 is a diagram illustrating the outline configuration of a user terminal according to the present embodiment.

Next description is made, with reference to FIG. 12, about the configuration of a user terminal performing feedback of transmission acknowledgement signals.

The following description treats the case where, under application of CA, the user terminal feeds back transmission acknowledgement signals, using a channel of a predetermined cell (PUCCH or PUSCH), and a predetermined PUCCH format (PUCCH format 1a/1b, channel selection, PUCCH format 3). In the following description, it is assumed that transmission acknowledgement signals are transmitted in response to downlink shared channel (PDSCH) signals of a plurality of CCs (PCell and SCell).

The user terminal illustrated in FIG. 12 has a transmission section and a reception section. The reception section has a channel separating section 1400 configured to separate a reception signal into control information and a data signal, a data information demodulating section 1401 configured to demodulate ODFM signals, and a retransmission control determining section 1402 configured to determine retransmission of downlink data signals for each of PCell and SCell. The transmission section has a transmission acknowledgement signal selecting section 1201, an uplink shared channel (PUSCH) processing section 1000, a first ACK/NACK processing section 1100, a second ACK/NACK processing section 1110, an SRS signal generating section 1301, a DM-RS signal generating section 1302, a channel multiplexing section 1202, an IFFT section 1203, and a CP inserting section 1204. The transmission acknowledgement signal selecting section 1201, the uplink shared channel (PUSCH) processing section 1000, the first ACK/NACK processing section 1100 and the second ACK/NACK processing section 1110 are used to control feedback of transmission acknowledgement signals (retransmission control signals).

The data information demodulating section 1401 receives and demodulates downlink OFDM signals. That is, the data information demodulating section 1401 removes CP from the downlink OFDM signals, performs fast Fourier transform, extracts subcarriers to which BCH signals or downlink control signals are allocated, and performs data demodulation. When receiving downlink OFDM signals on a plurality of CCs, the data information demodulating section 1401 demodulates data per CC. The data information demodulating section 1401 outputs data-demodulated downlink signals to the retransmission control determining section 1402.

The retransmission control determining section 1402 determines whether or not a received downlink data signal (PDSCH signal) is received without error, and the retransmission control determining section 1402 determines retransmission for each of states including ACK when the downlink shared channel signal has been received without error, NACK when error has been detected, and DTX when a downlink data signal has not been detected. In intra-cell CA, when a CC is allocated to communication with each radio base station, the macro base station determines whether a downlink data signal has been received without error per CC. On the other hand, in inter-cell CA, the retransmission control determining section 1402 of each base station determines downlink data signals of a CC corresponding to the radio base station. The retransmission control determining section 1402 outputs a determination result to the transmission section (here, transmission acknowledgement signal selecting section 1201).

The transmission acknowledgement signal selecting section 1201 selects a physical uplink channel and a PUCCH format applied to feedback of a transmission acknowledgement signal. Specifically, the transmission acknowledgement signal selecting section 1201 determines whether a transmission acknowledgement signal is transmitted as included in an uplink shared channel (PUSCH) or it is transmission in an uplink control channel (PUCCH), in accordance with presence or absence of transmission of an uplink data signal. When the signal is transmitted in the uplink control channel, the transmission acknowledgement signal selecting section 1201 selects a PUCCH format to be applied to the transmission acknowledgement signal.

For example, when an uplink signal (user data) is to be transmitted by PUSCH, the transmission acknowledgement signal selecting section 1201 receives a determination result output from the retransmission control determining section 1402 and outputs the determination result to the uplink shared channel processing section 1000. On the other hand, when no uplink signal (user data) is to be transmitted, the transmission acknowledgement signal selecting section 1201 outputs the determination result to the first ACK/NACK processing section 1100 for PUCCH format 1a/1b and the second ACK/NACK processing section 1110 for PUCCH format 3 so that each transmission acknowledgement signal can be generated in a predetermined PUCCH format.

When transmitting as feedback a transmission acknowledgement signal by using a PUCCH resource, the transmission acknowledgement signal selecting section 1201 is able to select the PUCCH format based on the number of cells (PCell and SCell) to which carrier aggregation is applied. For example, when there are two cells to which CA applies, channel selection is performed, and when there are three or more cells to which CA applies, PUCCH format 3 (PUCCH format 1a/1b when PDCCH of PCell is only received) is applied.

The uplink shared channel processing section 1000 has a control information bit determining section 1006 configured to determine bits of a transmission acknowledgement signal based on a determination result of the retransmission control determining section 1402, a channel coding section 1007 configured to perform error correction coding on ACK/NACK bit sequences, a channel coding section 1001 configured to perform error correction coding on data sequences to transmit, data modulating sections 1002 and 1008 configured to perform data modulation on coded data signals, a time multiplexing section 1003 configured to perform time multiplexing on modulated data signals and transmission acknowledgement signals, a DFT section 1004 configured to perform DFT (Discrete Fourier Transform) on multiplexed signals, and a subcarrier mapping section 1005 configured to map signals having been subjected to DFT, to subcarriers.

The first ACK/NACK processing section 1100 for the PUCCH format 1a/1b has a channel selection control section 101 configured to control PUCCH resources to use in transmission of transmission acknowledgement signals, a PSK data modulating section 1102 configured to perform PSK data modulation, a cyclic shift section 1103 configured to insert cyclic shift to data modulated by the PSK data modulating section 1102, a block spreading section 1104 configured to perform block spreading on cyclic shift-inserted signals by block spreading codes, and a subcarrier mapping section 1105 configured to map block-spread signals to subcarriers.

The channel selection control section 1101 determines PUCCH resources to use in transmission of transmission acknowledgement signals from a CCE index of PCell PDCCH or SCell PDCCH. For example, in intra-cell CA, in channel selection, a plurality of PUCCH resources that constitute candidates for allocation of transmission acknowledgement signals (for example, Ch1 to Ch4 in FIG. 4) are determined by the CCE index of PCell PDCCH or SCell PDCCH. The resource selection information is given to the PSK data modulating section 1102, the cyclic shift section 1103, the block spreading section 1104 and the subcarrier mapping section 1105. On the other hand, in inter-cell CA, the PUCCH resources to use in allocation of transmission acknowledgement signals may be given by PUCCH format 1a/1b in Rel. 10 or earlier versions. That is, the channel selection control section in each radio base station determines the PUCCH resources to use in PUCCH format 1a/1b.

The PSK data modulating section 1102 performs phase modulation (PSK data modulation) based on information given from the channel selection control section 1101. For example, the PSK data modulating section 1102 performs modulation into 2-bit bit information by QPSK data modulation.

The cyclic shift section 1103 performs orthogonal multiplexing using cyclic shift of CAZAC (Constant Amplitude Zero Auto Correlation) code sequence. Specifically, the cyclic shift section 1103 shifts a time-domain signal by a predetermined cyclic shift amount. The cyclic shift amount differs per user and is associated with a cyclic shift number. The cyclic shift section 1103 outputs a cyclic-shifted signal to the block spreading section 1104. The block spreading section (orthogonal code multiplying section) 1104 multiplies a cyclic-shifted reference signal by an orthogonal code (performs block spreading). Here, an OCC (block spreading code number) to use for a reference signal may be given from higher layers by RRC signaling, or may be an OCC that is associated in advance with a CS of a data symbol. The block spreading section 1104 outputs a block-spread signal to the subcarrier mapping section 1105.

The subcarrier mapping (allocating) section 1105 maps block-spread signals to subcarriers based on information given from the channel selection control section 1101. The subcarrier mapping section 1105 outputs mapped signals to the channel multiplexing section 1202.

The second ACK/NACK processing section 1110 for PUCCH format 3 has a channel coding section 1111 configured to perform error correction coding on ACK/NACK bit sequences, a PSK data modulating section 1112 configured to perform PSK data modulation, a DFT section 1113 configured to perform DFT on data modulated by the PSK data modulating section 1112, a block spreading section 1114 configured to perform block spreading on DFT-subjected signals by block spreading codes, and a subcarrier mapping section 1115 configured to map block-spread signals to subcarriers.

The DFT section 1113 performs DFT on data-modulated signals, converts them into frequency-domain signals and outputs DFT-subjected signals to the block spreading section 1114. The block spreading section 1114 multiplies DFT-subjected signals by orthogonal codes (OCC: block spreading code number). OCC may be given from higher layers by RRC signaling or may be OCC that is associated in advance with CS of a data symbol.

The subcarrier mapping section (allocating section) 1115 maps block-spread signals to subcarriers. The subcarrier mapping section 1115 outputs mapped signals to the channel multiplexing section 1202. The PUCCH resources to map may be predetermined resources that are designated by ARI contained in downlink control information of SCell from resources of a plurality of SCells given from the radio base station by higher layer signaling (for example, RRC signaling).

The SRS signal generating section 1301 generates SRS (Sounding RS) signals and output them to the channel multiplexing section 1202. The DM-RS signal generating section 1302 generates DM-RS signals and output them to the channel multiplexing section 1202.

The channel multiplexing section 1202 time-division-multiplexes signals from the uplink shared channel processing section 1000, the first ACK/NACK processing section 1100 and the second ACK/NACK processing section 1110 and reference signals from the SRS signal generating section 1301 and the DM-RS signal generating section 1302 thereby to generate transmission signals including uplink control channel signals.

The IFFT section 1203 performs IFFT on the channel-multiplexed signals and converts them into time-domain signals. The IFFT section 1203 outputs IFFT-subjected signals to the CP inserting section 1204. The CP inserting section 1204 inserts CP to signals having been subjected to orthogonal cod multiplying. Then, the uplink transmission signals are transmitted to the radio base station, using PUCCH resources of PCell and/or SCell.

Figure 13:
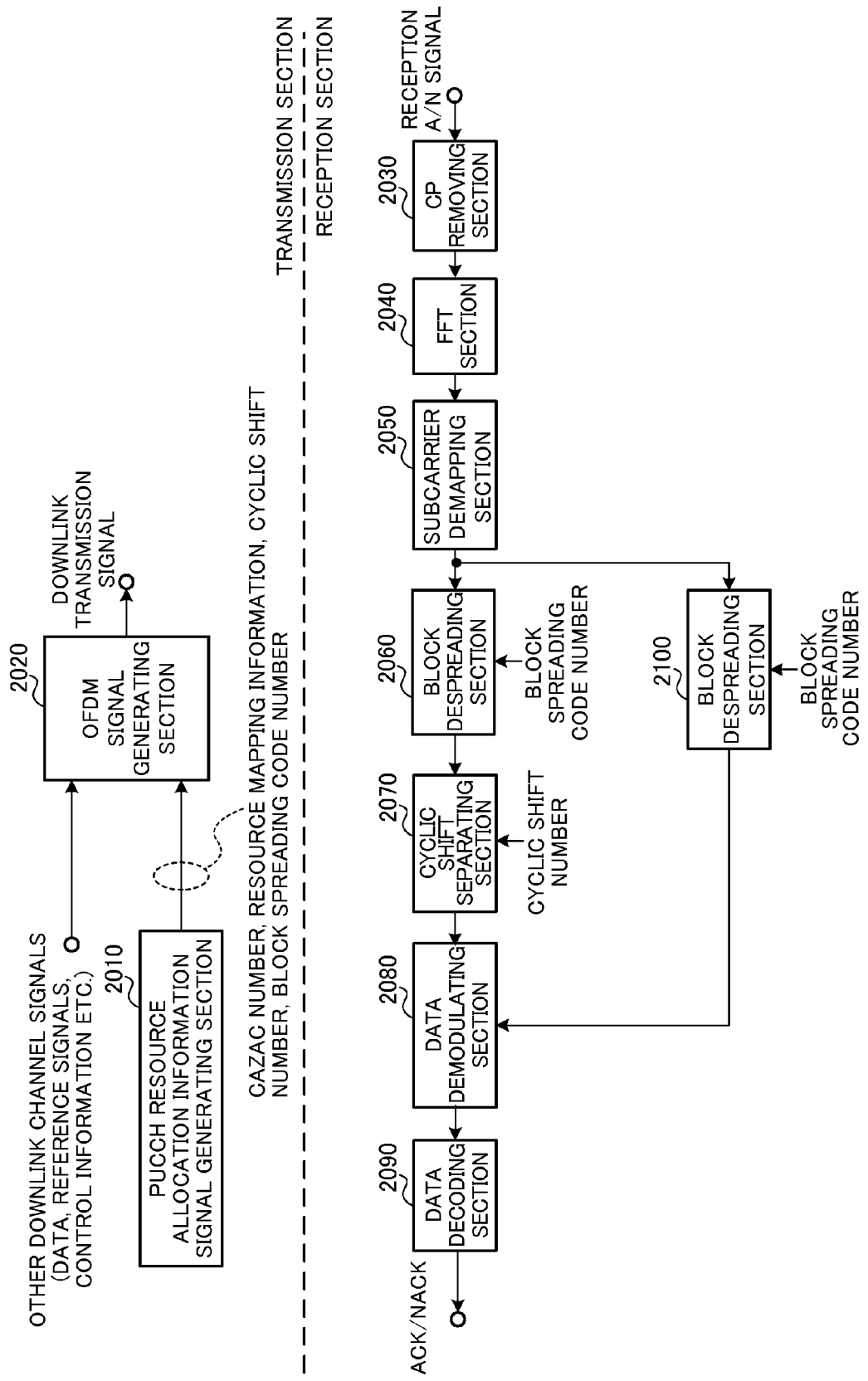
FIG. 13 is a diagram illustrating the outline configuration of a radio base station according to the present embodiment.

Next description is made, with reference to FIG. 13, about the functional structure of a radio base station performing radio communication with the user terminal illustrated in FIG. 12 mentioned above.

The radio base station illustrated in FIG. 13 has a transmission section and a reception section. The transmission section has an uplink resource (PUCCH resource) allocation information signal generating section 2010, and an OFDM signal generating section 2020 configured to multiplex other downlink channel signals and uplink resource allocation information signals thereby to generate OFDM signals. Here, the other downlink channel signals may include data, reference signals, control signal and the like.

The uplink resource allocation information signal generating section 2010 generates uplink resource allocation information signals including CAZAC number, resource mapping information (RB index), cyclic shift number and block spreading code number (OCC number). For example, when the user terminal is configured with the PUCCH format 3, the uplink resource allocation information signal generating section 2010 determines a plurality of PUCCH resource candidates to give by higher layer signaling (for example, RRC signaling) and PUCCH resources to give by ARI.

The uplink resource allocation information signal generating section 2010 configures SCell resources as the plurality of PUCCH resource candidates when the user terminal is configured with the PUCCH format 3.

The OFDM signal generating section 2020 maps downlink channel signals including other downlink data signals and uplink resource allocation information signals to subcarriers, performs Inverse Fast Fourier Transform (IFFT), inserts CP and generates downlink transmission signals. Thus generated downlink transmission signals are transmitted to the user terminal on downlink.

The reception section includes a CP removing section 2030 configured to remove CP from reception signals, an FFT section 2040 configured to perform Fast Fourier Transform (FFT) on reception signals, a subcarrier demapping section 2050 configured to demap signals having been subjected to FFT, block despreading sections 2060 and 2100 configured to despread subcarrier-demapped signals by block spreading codes (OCCs), a cyclic shift separating section 2070 configured to remove cyclic shift from subcarrier-demapped signals to separate signals for a target user, a data demodulating section 2080 configured to perform data demodulation on user-separated signals and despread signals, and a data decoding section 2090 configured to decode data-demodulated signals.

Here, in the functional block diagram of the reception section, a processing block for receiving user data (PUSCH) is not illustrated, but user data (PUSCH) is demodulated in a data demodulating section (not shown) and is decoded in a data decoding section (not shown).

The CP removing section 2030 removes a CP corresponding part to extract a valid signal part. The CP removing section 2030 outputs CP-removed signals to an FFT section 2040. The FFT section 2040 performs FFT on reception signals and converts them into frequency-domain signals. The FFT section 2040 outputs signals having been subjected to FFT, to the subcarrier demapping section 2050. The subcarrier demapping section 2050 extracts transmission acknowledgement signals as uplink control channel signals from frequency-domain signals, using resource mapping information. The subcarrier demapping section 2050 outputs extracted transmission acknowledgement signals to the block despreading sections 2060 and 2100.

The block despreading section 2060 despreads reception signals having been block spread or orthogonal-multiplexed using orthogonal codes (OCCs), by using orthogonal codes used in the user terminal. Then, the block despreading section 2060 outputs the despread signals to the cyclic shift separating section 2070.

The cyclic shift separating section 2070 separates control signals having been orthogonal-multiplexed using cyclic shift, by using cyclic shift numbers. The uplink control signals from the user terminal 10 are those cyclically shifted by cyclic shift amounts that differ among users. Accordingly, the uplink control signals are subjected to cyclic shift in the reverse direction by the same cyclic shift amounts as those performed in the user terminal 10 so that control signals for the user as a reception processing target can be separated. The block despreading section 2060 and the cyclic shift separating section 2070 perform processing on transmission acknowledgement signals generated in PUCCH format 1a/1b.

The block despreading section 2100 performs despreading on reception signals having been orthogonal-multiplexed using block spreading, that is, orthogonal codes (OCCs), by using orthogonal codes used by the user terminal. Here, the block despreading section 2100 performs processing on transmission acknowledgement signals generated in PUCCH format 3.

The data demodulating section 2080 performs data demodulation on cyclic shift-separated signals or block-despread signals and outputs demodulated signals to the data decoding section 2090. The data decoding section 2090 decodes signals output from the data demodulating section 2080 to obtain retransmission control information (ACK/NACK, etc.) per cell. The radio base station performs transmission of new data (in ACK case) and retransmission of data (in NACK case) using the retransmission control information.

As described up to this point, by using the PUCCH resources of PCell and SCell as a plurality of PUCCH resources as candidates to allocate with transmission acknowledgement signals, even if intra-cell CA is performed in HetNet, it is possible to minimize increase of PUCCH resources of PCell required for allocation of transmission acknowledgement signals.

The number of processing sections and processing procedure described above may be modified appropriately without departing from the scope of the present invention. Each of the elements illustrated represents its function, and each functional block may be implemented by hardware or software. The configurations described in the embodiments may be combined appropriately to be implemented.

The disclosure of Japanese Patent Application No. 2012-274881 filed on Dec. 17, 2012, including the specification, drawings, and abstract, is incorporated herein by reference in its entirety.

The invention claimed is:

1. A user terminal comprising:
   a reception section that receives downlink shared channel signals using component carriers of a primary cell and a secondary cell;
   a generating section that generates transmission acknowledgement signals in response to the downlink shared channel signals; and
   a transmission section that transmits the transmission acknowledgement signals by using predetermined uplink control channel resources,
   wherein the transmission section transmits the transmission acknowledgement signals to either or both of uplink control channel resources of the primary cell and uplink control channel resources of the secondary cell in accordance with contents of the transmission acknowledgement signals and/or an uplink control channel format, and
   when three or more cells are configured and the user terminal does not receive downlink control information from the secondary cell, the transmission section transmits the transmission acknowledgement signals by using the uplink control channel resources of the primary cell.

2. The user terminal according to claim 1, wherein, when two cells are configured, the uplink control channel resources of the primary cell and the uplink control channel resources of the secondary cell are configured as uplink control channel resource candidates for transmitting the transmission acknowledgement signals, and the transmission section transmits the transmission acknowledgement signals to either of the uplink control channel resources of the primary cell and the uplink control channel resources of the secondary cell in accordance with the contents of the transmission acknowledgement signals.

3. The user terminal according to claim 1, wherein, when three or more cells are configured, a plurality of uplink control channel resources of secondary cells are configured as uplink control channel resource candidates for transmitting the transmission acknowledgement signals, and the transmission section transmits the transmission acknowledgement signals by using the predetermined uplink control channel resources selected from the plurality of uplink control channel resources of the secondary cells, based on downlink control information of the secondary cells.

4. The user terminal according to claim 3, wherein the plurality of uplink control channel resources of the secondary cells are given by higher layer signaling.

5. The user terminal according to claim 1, wherein the transmission section transmits transmission acknowledgement signals in response to downlink shared channel signals of the primary cell by using the uplink control channel resources of the primary cell that are determined using a CCE index of downlink control channels corresponding to the downlink shared channel signals of the primary cell, and the transmission section transmits transmission acknowledgement signals in response to downlink shared channel signals of the secondary cell by using the uplink control channel resources of the secondary cell that are determined using a CCE index of downlink control channels corresponding to the downlink shared channel signals of the secondary cell.

6. A radio base station comprising:
a transmission section that transmits downlink shared channel signals to a user terminal;
a reception section that receives transmission acknowledgement signals in response to the downlink shared channel signals from the user terminal by using given uplink control channel resources; and
a control section that controls retransmission based on the transmission acknowledgement signals,
wherein
the reception section receives the transmission acknowledgement signals in either or both of uplink control channel resources of a primary cell and uplink control channel resources of a secondary cell in accordance with contents of the transmission acknowledgement signals and/or an uplink control channel format, and
when three or more cells are configured and the user terminal does not receive downlink control information from the secondary cell, the reception section receives the transmission acknowledgement signals by using the uplink control channel resources of the primary cell.

7. A radio communication method for a user terminal comprising:
receiving
downlink shared channel signals using component carriers of a primary cell and a secondary cell;
generating transmission acknowledgement signals in response to the downlink shared channel signals; and
transmitting the transmission acknowledgement signals by using predetermined uplink control channel resources,
wherein the user terminal transmits the transmission acknowledgement signals to either or both of uplink control channel resources of the primary cell and uplink control channel resources of the secondary cell in accordance with contents of the transmission acknowledgement signals and/or an uplink control channel format, and
when three or more cells are configured and the user terminal does not receive downlink control information from the secondary cell, the user terminal transmits the transmission acknowledgement signals by using the uplink control channel resources of the primary cell.

* * * * *